United States Patent Office 3,579,529
Patented May 18, 1971

3,579,529
HETEROCYCLIC COMPOUNDS
Kevan Brown, Woodley, and John F. Cavalia, Isleworth, England, assignors to John Wyeth & Brother Limited, Taplow Maidenhead, England
No Drawing. Filed Oct. 15, 1968, Ser. No. 767,853
Claims priority, application Great Britain, Oct. 26, 1967, 48,641/67
Int. Cl. C07d 91/32, 85/44
U.S. Cl. 260—302    11 Claims

ABSTRACT OF THE DISCLOSURE

A group of oxazoles and thiazoles substituted by a cycloaliphatic radical in the 2-position and an aliphatic acidic radical in the 4-position is described. The compounds are useful as anti-inflammatory agents.

---

This invention relates to novel oxazoles and thiazoles, to processes for the preparation thereof and to pharmaceutical compositions containing such compounds.

A well-known drug having anti-inflammatory activity is phenylbutazone, though this has disadvantages, e.g. ulcerogenic activity. Another drug used to treat inflammation is aspirin though high doses are required and furthermore it is very ulcerogenic.

In our search for compounds possessing anti-inflammatory activity we have now discovered a new and novel series of compounds which show high anti-inflammatory activity and substantially no ulcerogenic activity. These new compounds are oxazoles and thiazoles of the general formula

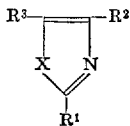

(I)

and acid addition salts thereof, in which X is oxygen or sulphur, $R^1$ is a cycloalkyl radical containing 5 to 7 ring carbon atoms, $R^2$ is an acetic, acrylic or propionic acid radical or a salt, ester, amide or hydroxamic acid derivative thereof, and $R^3$ is a hydrogen atom, a lower alkyl radical containing 1 to 4 carbon atoms or an aryl radical (which may be a heteroaryl radical). The usual numbering for oxazole and thiazole rings is used herein, i.e. $R^1$ is in the 2-position, $R^2$ is in the 4-position and $R^3$ is in the 5-position.

The compounds of the above general formula exhibit anti-inflammatory activity with little or no ulcerogenic activity, as shown by tests on warm blooded animals, which tests are described in more detail below.

The radical $R^1$ is a cycloalkyl radical containing from 5 to 7 carbon atoms such as cyclopentyl, cyclohexyl or cycloheptyl. The radical $R^2$ is an acetic, n-propionic, isopropionic or acrylic acid radical or a salt, amide, ester (e.g. an alkyl or substituted alkyl ester such as a dimethylaminoethyl ester) or a hydroxamic acid derivative thereof. The radical $R^3$ is a hydrogen atom, an alkyl radical containing 1 to 4 carbon atoms or a substituted or unsubstituted aryl radical, which may be a heteroaryl radical. Examples of radical $R^3$ are hydrogen, methyl, phenyl, halophenyl (e.g. chloro, bromo or fluorophenyl), alkylphenyl (e.g. tolyl), alkoxyphenyl (e.g. methoxyphenyl), nitrophenyl, trifluoromethylphenyl, 1- or 2-naphthyl, 2- or 3-furyl or 2- or 3-thienyl. Substituents in a phenyl ring can be present in the o-, m- or p-position or in more than one position, though preferably $R^3$ is a hydrogen atom.

The new and novel compounds of the above general formula can be prepared by suitable general methods known in the art, e.g. from the corresponding nitriles and haloalkyl compounds.

When X is a sulphur atom, an α-haloketone of the general formula

(II)

may be reacted with a thioamide of the general formula

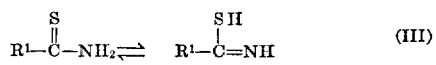

(III)

(in which X, $R^1$ and $R^3$ have the meaning defined above, $R^4$ has the same meaning as $R^2$ or is a radical convertible thereto and Hal is a halogen atom, for example chlorine or bromine) and if necessary an after-reaction may be carried out to form the radical $R^2$ and $R^4$.

In this reaction the radical $R^4$ may be a lower alkoxycarbonyl alkyl radical but if $R^3$ is hydrogen the radical $R^4$ preferably is a haloalkyl radical and the compound obtained generally is of the general formula

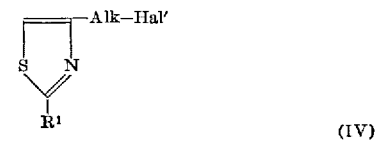

(IV)

where $R^1$ has the meanings defined above, Alk is an alkylene radical (preferably methylene) and Hal' is a halogen atom which can be the same as or different from Hal. The compound of general Formula IV is then converted to the desired compound of general Formula I in known manner. For example, it may be reacted with an alkali metal cyanide (e.g. potassium cyanide) to give the nitrile, which may be hydrolysed to the amide or acid. Alternatively the haloalkyl radical can be reacted with an alkali metal diester of an acid containing at least 3 carbon atoms (e.g. a molonic acid diester), followed by hydrolysis and monodecarboxylation. If desired a homologation reaction can be carried out using the Arndt-Eistert process.

When it is desired to prepare a compound of general Formula I in which X is an oxygen atom, a suitable method known in the art for the preparation of oxazoles can be used (see for example "Heterocyclic compounds," volume 5 by Robert E. Elderfield, published by Wiley and Sons pages 302–323). When $R^3$ is hydrogen, the known iminoether synthesis can be applied, for example following the reaction scheme illustrated below.

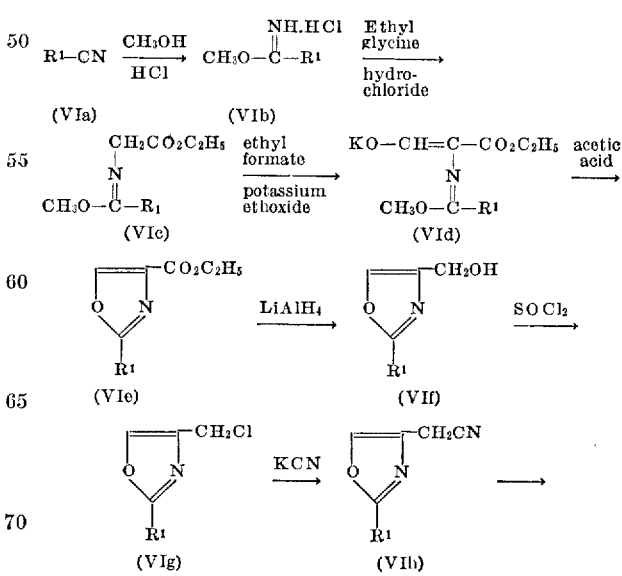

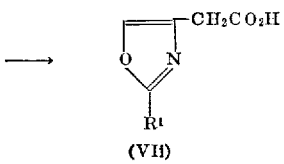

(VII)

In this synthesis, a cyanide of Formula VIa, for example cyclohexylnitrile is reacted with an alkanol (preferably methanol) in the presence of a hydrogen halide (e.g. the chloride) to give a compound of Formula VIb. Reaction of this with an alkyl glycine hydrohalide (such as ethyl glycine hydrochloride) gives a compound of Formula VIc, which yields a compound of Formula VId on reaction with an alkyl formate and an alkali metal alkoxide. The compound of Formula VId can be cyclised, e.g. with acetic acid and the ester of Formula VIe, optionally hydrolysed to the acid, then reduced to the hydroxymethyl compound of Formula VIf. Halogenation (e.g. with thionyl chloride) followed by reaction with an alkali metal cyanide gives the nitrile of Formula VIh which can be hydrolysed to the acid of Formula VIi. If desired, an oxazole of general Formula VIg or VIi can be homologated in known manner, e.g. as described above in connection with the thiazoles.

The starting materials for the above processes are known or can be prepared following the methods described in the art for the corresponding known compounds of similar formula. Thus compounds of general Formula III can be prepared following the procedure known for the corresponding thiobenzamides and compounds of general Formula II may be prepared by halogenating the corresponding unhalogenated keto compound. For example, a ketoester may be prepared from phenylacetyl chloride and diethyl ethoxymagnesiomalonate and then brominated.

Once the oxazole or thiazole ring containing radical $R^4$ has been obtained the desired radical $R^2$ can be formed in known manner, e.g. a nitrile can be hydrolysed to the amide or acid, or hydrolysed in the presence of an alcohol to give an ester. The hydrolysis to yield the amide should be under controlled conditions, e.g. with cold concentrated mineral acid such as hydrochloric acid, as too strong conditions give the acid. The amide can also be obtained by converting the acid to a halide (e.g. with thionyl chloride) and reacting with ammonia, or by heating the ammonium salt. On the other hand, particularly preferred compounds are obtained by hydrolysing the acetonitrile to give the acetic acid derivative. The acid can be converted to a salt with a base, esterified to give an ester or reacted with an acyloxymethyl halide to give the acyloxymethyl ester. An alkyl ester can be reacted with hydroxylamine to give the hydroxamic acid derivative. Furthermore, a compound in which $R^3$ is an acrylic acid radical can be obtained from a corresponding compound having a formyl radical in the 4-position by condensation with malonic acid.

The new and novel compounds of general Formula I contain a basic ring nitrogen atom capable of forming acid addition salts on treatment with pharmaceutically acceptable acids, though these salts are easily hydrolysed, and the invention also provides such salts.

The new and novel compounds in standard pharmacological procedures generally demonstrates anti-inflammatory activity with substantially no ulcerogenic activity and are useful as agents for the treatment of inflammation.

In the pharmacological evaluation of the properties of the compounds of this invention the effects in vivo of the compounds are tested in the procedure of Winter et al. in Proc. Soc. Exp. Biol. Med. 111, 544 (1962), and Buttle et al. in Nature 179, 629 (1957).

The compounds of general Formula I when administered orally in the above test procedure at a dosage of 10 to 250 mg./kg., depending on the compound in question, generally demonstrated anti-inflammatory activity. Since the percent inhibition for a test compound can show deviations on different days, a comparison test by the above procedure was carried out with a number of thiazoles of general Formula I at one time and using phenylbutazone as standard. The results are given below, the radical $R^1$ being in the 2-position, $R^2$ in the 4-position and $R^3$ in the 5-position of the thiazole ring:

| $R^1$ | $R^2$ | $R^3$ | Oral dose in m.p.k. | Percent inhibition | Ulcer score |
|---|---|---|---|---|---|
| Cyclohexyl | Acetic acid | H | 100 | 56 | 0 |
| Do | Acetamide | H | 100 | 78 | 1 |
| Do | Acrylic acid | H | 100 | 24 | 1 |
| Do | Acrylamide | H | 100 | 25 | 0 |
| Do | Acetic acid | Phenyl | 100 | 26 | 2 |
| Do | Acetic acid β-dimethylamino ethyl ester | H | 100 | 52 | 0 |
| Do | Isopropionic acid | H | 100 | 69 | 0 |
| Phenylbutazone | | | 100 | 47 | 15 |

The ulcer score was determined by removing the stomachs of the animals after sacrifice, examining each stomach for the incidence of ulcers and allotting a score in the range 0–5 to each stomach, taking into account the extent of ulceration, haemorrhage, cell debris and colour of the mucosa. Since 6 animals were used for each test compound, the maximum ulcer score would be 30 (i.e. 6 animals × 5 points), whereas a completely non-ulcerogenic compound would have a score of zero. It is seen that the new and novel compounds of the present invention are considerably less ulcerogenic than phenylbutazone.

Furthermore, 2-cyclohexylthiazol-4-ylacetic acid was tested as described below to see if it caused jaundice and was found to be free from this hazard as the direct van den Bergh was negative and the plasma bilirubin was less than 0.1 mg./100 ml.

In order to test for the incidence of jaundice, female Charles River rats (Sprague-Dawley strain) were dosed intraperitoneally with 150 m.p.k. of 2-cyclohexylthiazol-4-ylacetic acid in 0.5% tween 80 containing 0.5% carboxymethylcellulose. Four hours later the animals were sacrificed with ether and bled from the inferior vena cava. Approximately 2.4 mg. of Pularin heparin (mucous) was added for each 5 ml. of blood. Plasma biliribin was estimated in known manner by the method of Powell (Am. J. Chem. Path., 14, 55 (1944)) and observation of the direct van den Bergh reaction was made after the addition of diazo reagent.

When the compounds of this invention are employed as anti-inflammatory agents they may be administered to warm-blooded animals, e.g. mice, rats, rabbits, dogs, cats or monkeys alone or in combination with pharmacologically acceptable carriers, the proportion of which is determined by the solubility and chemical nature of the compounds, chosen route of administration and standard biological practice. For example, they may be administered orally in the form containing such excipients as starch, milk, or sugar. They may also be administered orally in the form of solutions or they may be injected parenterally. For parenteral administration they may be used in the form of a sterile solution or suspension containing other solutes, for examples enough saline or glucose to make the solution isotonic.

The dosage of the present agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The invention therefore provides a pharmaceutical composition which comprises a compound of general Formula I or an acid addition salt thereof and a non-toxic carrier. Advantageous pharmaceutically active forms generally are those when $R^2$ is a carboxyalkyl group which may be in salt or amide form (e.g. as an alkali metal salt, particularly sodium and potassium salts). The composition may be in unit dosage form, e.g. as tablets or capsules.

The following non-limiting examples illustrate the invention:

EXAMPLE 1

2-cyclohexylthiazol-4-ylacetic acid (a) Cyclohexanethiocarboxamide (8.0 g.) and sym-dichloroacetone (7.1 g.) were mixed together in acetone (30 ml.) and left over-night. Filtration gave the hydrochloride salt of 4-chloromethyl - 2 - cyclohexyl - 4 - hydroxy-$\Delta^2$-thiazoline (13.3 g.), which was dehydrated by heating in refluxing methanol (250 ml.) for 3 hours. The solvent was evaporated and the residue was treated with sodium bicarbonate solution and ether. The ether layer was separated, washed with water, dried ($MgSO_4$) and evaporated to give 4-chloromethyl-2-cyclohexylthiazole (10.0 g.) as an oil.

(b) The chloromethyl compound (10.0 g.) in ethanol (30 ml.) and water (5 ml.) was treated with potassium cyanide (5 g.) and the resulting mixture was heated on a steam bath for 4¼ hours. On cooling, water (200 ml.) and ether (200 ml.) were added and the ether layer was separated, washed well with water, then with saturated brine and finally dried ($MgSO_4$). Evaporation of the solvent gave 4-cyanomethyl-2-cyclohexylthiazole as an oil which was heated in 6 N hydrochloric acid (100 ml.) for 1¼ hours. On cooling, the acidic solution was made alkaline with 10 N sodium hydroxide and then treated with charcoal. Filtration gave a water white solution from which a crystalline solid was obtained on acidification with concentrated hydrochloric acid. Recrystallization from benzene gave long, felting needles (7.5 g., 60%) of the title compound. M.P. 132–133° C.

*Analysis.*—Found (percent): C, 58.9; H, 7.0; N, 6.3; S, 14.4. $C_{11}H_{15}NO_2S$ (percent) requires C, 58.7; H, 6.7; N, 6.2; S, 14.2.

EXAMPLE 2

2-cyclohexylthiazol-4-ylacetamide 2-cyclohexylthiazol-4-ylacetic acid (3.1 g.) was suspended in methylene chloride (100 ml.) and thionyl chloride (1.2 ml.) was added. The mixture was refluxed for 1 hour and then evaporated to a dark red gum. Dioxan (10 ml.) was added followed by concentrated ammonium hydroxide solution (25 ml.) and the resulting oil was extracted with chloroform. The extract was washed with water, then saturated brine solution and finally evaporated to a dark red gummy solid which was recrystallised from benzene to give large colourless plates of the required amide (0.6 g., 20%), M.P. 136–137° C.

*Analysis.*—Found (percent): C, 58.8; H, 7.2; N, 12.5; S, 14.4. $C_{11}H_{16}N_2OS$ (percent) requires C, 58.9; H, 7.2; N, 12.5; S, 14.3.

EXAMPLE 3

α-(2-cyclohexylthiazol-4-yl)propionic acid

Cyclohexanethiocarboxamide (7.5 g.) and ethyl-4-bromo-2-methylacetoacetate (11 g.) in absolute ethanol (100 ml.) were kept at 0° C. for 48 hours and then heated on a steam bath for 20 minutes. Without isolating the thiazole ester, potassium hydroxide (5 g.) in water (10 ml.) was then added and heating was continued for a further 1 hour. The solution was then diluted with water, washed well with ether and then acidified with glacial acetic acid. The resulting oil was extracted with ether, and the ether extract was washed with water, dried ($MgSO_4$) and evaporated to give the required acid which was converted into the hydrochloride salt (950 mg. 9%) with ethereal hydrogen chloride, M.P. 173–176° C.

*Analysis.*—Found (percent): C, 52.7; H, 6.7; N, 5.0. $C_{12}H_{18}ClNO_2S$ (percent) requires C, 52.2; H, 6.6; N, 5.1.

EXAMPLE 4

β-(2-cyclohexylthiazol-4-yl)propionic acid

Diethylmalonate (60 ml.) was added to a solution of sodium (10 g.) in absolute ethanol (500 ml.). To this refluxing solution, 4-chloromethyl-2-cyclohexylthiazole (20 g.) was added dropwise over a period of 1½ hours. After a further 2 hours at this temperature the solution was evaporated and water was added to the residue. The resulting oil was extracted into ether and the solvent was then removed. Potassium hydroxide (25 g.) in water (25 ml.) was added and the mixture was refluxed for 1½ hours. The pH was then adjusted to pH 3 by the addition of concentrated hydrochloric acid and the resulting oil was extracted with ether. The ether extract was washed with water, dried ($MgSO_4$) and evaporated to give a crystalline malonic acid derivative which was decarboxylated by heating for 2 hours at 170° under a stream of nitrogen to give the required acid as a liquid. This was converted to the hydrochloride salt (6.1 g., 39%), M.P. 155–157° C., with ethereal hydrogen chloride.

*Analysis.*—Found (percent): C, 52.5; H, 6.7; N, 5.0. $C_{12}H_{18}ClNO_2S$ (percent) requires C, 52.2; H, 6.6; N, 5.1.

This compound could be converted to β-(2-cyclohexylthiazol-4-yl) propionamide of M.P. 108–109° C. in about 66% yield, following the procedure of Example 2.

EXAMPLE 5

2-cyclohexyl-5-phenylthiazol-4-ylacetic acid

Cyclohexane thiocarboxamide (7.0 g.) was dissolved in the minimum amount of acetone and the solution added to 3-oxo-4-bromo-4-phenylbutyric acid (16.2 g.). After remaining at room temperature for 4 days, the solvent was removed and the oil dissolved in methanol (100 ml.) and boiled under reflux for 2 hours. When cool, potassium hydroxide (15 g.) in water (20 ml.) was added and the solution warmed on a steam bath for 5 minutes and left at room temperature for 30 minutes. The solvent was removed and the product dissolved in water and ether. The aqueous layer was purified with charcoal and then acidified with concentrated hydrochloric acid to give a brown solid, M.P. 153–157° C. The crude product was recrystallised from benzene to give white needles of 2-cyclohexyl - 5 - phenylthiazol - 4 - ylacetic acid (5.5 g., 30.5%), M.P. 162–163° C.

*Analysis.*—Found (percent): C, 67.9; H, 6.5; N, 4.7. $C_{17}H_{19}NO_2S$ (percent) requires C, 67.7; H, 6.4; N, 4.7.

EXAMPLE 6

Ethyl 2-cyclohexylthiazol-4-ylacetate 2-cyclohexylthiazol-4-ylacetic acid (11.26 g.), absolute ethanol (150 ml.) and concentrated sulphuric acid (2 ml.) were heated under reflux for 16 hours. The solution was cooled, concentrated in vacuo to approximately 30 ml. and poured into water (500 ml.). The liberated ester was extracted three times into ether. The combined ether extracts were washed with water, 2 N sodium carbonate solution and water, dried ($MgSO_4$) and evaporated in vacuo to give the crude ester (10.42 g.).

Distillation in vacuo yielded the title compound as a colourless oil (8.56 g., 67.6%), B.P. 120–122° C./0.4 mm. Hg.

*Analysis.*—Found (percent): N, 5.2. $C_{13}H_{19}NO_2S$ (percent) requires N, 5.5.

EXAMPLE 7 n-Butyl 2-cyclohexylthiazol-4-ylacetate n-Butyl 2-cyclohexylthiazol-4-ylacetate was prepared, following the procedure of Example 7, from 2-cyclohexylthiazol-4-ylacetic acid (5.63 g.), n-butanol (75 ml.) and concentrated sulphuric acid (1 ml.).

Distillation in vacuo yielded the pure ester as a colourless oil (4.21 g., 59.9%), B.P. 134–136° C./0.5 mm. Hg.

*Analysis.*—Found (percent): N, 4.8. $C_{15}H_{23}NO_2S$ (percent) requires N, 5.0.

EXAMPLE 8

β-Dimethylaminoethyl 2-cyclohexylthiazol-4-ylacetate

Ethyl 2-cyclohexylthiazol-4-ylacetate (7.59 g.), dimethylaminoethanol (50 ml.), two small pieces of sodium metal and dry benzene (250 ml.) were heated under reflux for 16 hours. The solvent was evaporated in vacuo and the excess dimethylaminoethanol removed at 50° C./1 mm. The residue was dissolved in dilute hydrochloric acid and extracted with ether. The aqueous phase was basified with sodium carbonate and the liberated basic ester extracted into ether. The combined ether extracts were washed with water, dried ($MgSO_4$) and evaporated. Distillation of the crude oil yielded the title compound as a colourless oil (6.31 g., 71%), B.P. 146–150° C./0.15 mm. Hg.

*Analysis.*—Found (percent): C, 60.6; H, 8.55; N, 9.9. $C_{15}H_{24}N_2O_2S$ (percent) requires C, 60.8; H, 8.2; N, 9.45.

The ester formed a hygroscopic dihydrochloride when treated with ethereal hydrogen chloride. Recrystallisation from iso-propylalcohol/ether produced micro-needles, M.P. 129–132° C. (sealed tube).

*Analysis.*—Found (percent): C, 48.7; H, 7.4; N, 7.6. $C_{15}H_{24}N_2O_2S \cdot HCl$ (percent) requires C, 48.3; H, 7.7; N, 7.1.

EXAMPLE 9

β-(2-cyclohexylthiazol-4-yl)acrylic acid (a) 4-chloromethyl-2-cyclohexylthiazole (54 g.) and hexamethylenetetramine (38.5 g.) in chloroform (400 ml.) were heated at reflux temperature for 8 hours. On cooling the solution was evaporated to dryness and the residue was heated in refluxing 50% acetic acid (300 ml.) for 2 hours. The resulting mixture was filtered and the crystalline solid was recrystallised from ethanol to give 2-cyclohexylthiazol-4-ylcarboxaldehyde (28 g., 58%), M.P. 82–83° C.

(b) The aldehyde (19.5 g.) from part (a) and malonic acid (10.4 g.) were heated on a steam bath for 2½ hours with pyridine (25 ml.) and ethanol (50 ml.). After cooling for 16 hours, the solvents were evaporated and the residue was added to water. Addition of a few drops of concentrated hydrochloric acid completed the precipitation of the desired acid which was filtered off and dried under vacuum. Recrystallisation from benzene gave the acrylic acid (16.2 g., 68%), M.P. 148–149° C.

*Analysis.*—Found (percent): C, 61.0; H, 6.5; N, 5.9. $C_{12}H_{15}NO_2S$ (percent) requires C, 60.8; H, 6.4; N, 5.9.

EXAMPLE 10

Following the procedure shown in Example 2, β-(2-cyclohexylthiazol-4-yl)acrylic acid (8 g.) gave the desired amide (5.6 g., 70%), M.P. 179–180° C.

*Analysis.*—Found (percent): C, 61.2; H, 7.0; N, 12.1. $C_{12}H_{16}N_2OS$ (percent) requires C, 61.0; H, 6.8; N, 11.9.

EXAMPLE 11

2-cyclohexyloxazol-4-ylacetic acid (a) Methyliminocyclohexane carboxylate hydrochloride (412 g.) was treated with a strong solution of potassium carbonate (300 g.) and ether at below 0° C. The ethereal layer was washed well with water and agitated with glycine ethyl ester hydrochloride (310 g.) and water (250 ml.). The ethereal layer was separated, washed with water, dried ($MgSO_4$) and evaporated. The residual oil on distillation gave ethyl α-methoxyhexahydrobenzylideneaminoacetate as a colourless oil (249 g., 47%), B.P. 110–112° C./0.9 mm. Hg.

(b) Potassium (7.8 g.) in anhydrous ether (90 ml.) was treated with ethyl alcohol (29 ml.) and the resulting solution cooled below 0° C. and diluted to 350 ml. with ether. A mixture of the ethyl ester from above (45.4 g.). and ethyl formate (14.8 g.) was added to the stirred potassium ethoxide solution. After 1 hour, ether (500 ml.) was added and the crystalline potassium ethyl α-(α-methoxyhexahydrobenzylideneamino)-β-hydroxy acrylate was collected after being kept overnight at 0° C. Yield 34.3 g. (57.8%).

(c) The potassium salt (34.0 g.) was added during 10 minutes to boiling glacial acetic acid (75 ml.). After boiling for a further 10 minutes, the reaction was allowed to cool and ether was added. The ethereal mother liquors were filtered from the inorganic salt and washed with water, dried ($MgSO_4$) and evaporated to give a crystalline solid. The solid was recrystallised from petrol (60–80°) to give white rosettes of ethyl 2-cyclohexyloxazol-4-yl-carboxylate (15.7 g., 61%), M.P. 52.5–53.5° C.

(d) This ester was then reduced with lithium aluminium hydride to 2-cyclohexyl-4-hydroxymethyl oxazole. The ester from (c) also could be converted to 2-cyclohexyl-4-hydroxymethyl oxazole by hydrolysis with sodium hydroxide to give 2-cyclohexyloxazol-4-ylcarboxylate of M.P. 184–186° C., followed by reaction with thionyl chloride and subsequent reduction with sodium borohydride. 2-cyclohexyl-4-hydroxymethyl oxazole, on chlorination with thionyl chloride, yielded 2-cyclohexyl-4-chloromethyl oxazole which was then converted into the cyanomethyl compound and then to the title compound (M.P. 114–6° C.) following the procedure of Example 1.

*Analysis.*—Found (percent): C, 63.3; H, 7.3; N, 6.6. $C_{11}H_{15}NO_3$ (percent) requires C, 63.15; H, 7.2; N, 6.7.

EXAMPLE 12

(a) Follow the procedure of Example 1, but replace the cyclohexanethiocarboxamide by cyclopentanethiocarboxamide to obtain 2-cyclopentylthiazol-4-ylacetic acid.

(b) Follow the procedure of Example 1, but replace the cyclohexanethiocarboxamide by cycloheptanethiocarboxamide to obtain 2-cycloheptylthiazol-4-ylacetic acid.

EXAMPLE 13

Follow the procedure of Example 5, but replace the 3-oxo-4-bromo-4-phenylbutyric acid by the starting material given below to obtain the product indicated.

| Starting material | Product |
|---|---|
| (a) 3-oxo-4-bromo-4-(p-chlorophenyl)butyric acid. | 5-(p-chlorophenyl)-2-cyclohexylthiazol-4-ylacetic acid. |
| (b) 3-oxo-4-bromo-4-(p-bromophenyl)butyric acid. | 5-(p-bromophenyl)-2-cyclohexylthiazol-4-ylacetic acid. |
| (c) 3-oxo-4-bromo-4-(p-fluorophenyl)butyric acid. | 5-(p-fluorophenyl)-2-cyclohexylthiazol-4-ylacetic acid. |
| (d) 3-oxo-4-bromo-4-(o-tolyl)butyric acid. | 2-cyclohexyl-5-(o-tolyl)thiazol-4-ylacetic acid. |
| (e) 3-oxo-4-bromo-4-(p-methoxyphenyl)butyric acid. | 2-cyclohexyl-5-(p-methoxyphenyl)-thiazol-4-ylacetic acid. |
| (f) 3-oxo-4-bromo-4-(m-trifluoromethylphenyl)butyric acid. | 2-cyclohexyl-5-(m-trifluoromethylphenyl)thiazol-4-ylacetic acid. |
| (g) 3-oxo-4-bromo-4-(2'-thienyl)butyric acid. | 2-cyclohexyl-5-(2'-thienyl)-thiazol-4-ylacetic acid. |

EXAMPLE 14

| | Mg. |
|---|---|
| 2-cyclohexylthiazol-4-ylacetic acid | 125 |
| Lactose | 120 |
| Magnesium stearate | 5 |

Capsules of the above were made up by thoroughly mixing together batches of the above ingredients and filling hard gelatine capsules (250 mg.) with the mixture.

EXAMPLE 15

| | Mg. |
|---|---|
| 2-cyclohexylthiazol-4-ylacetic acid | 125 |
| Lactose | 100 |
| Avicel | 30 |
| Dried maize starch | 40 |
| Magnesium stearate | 5 |

Tablets of the above composition were made by milling the active ingredient to 40 mesh (British Standard), sieving through a 40 mesh (British Standard) sieve, mixing the milled material with the other components and compressing to form tablets.

The active compound of Examples 14 and 15 could be replaced by other compounds of general Formula I.

We claim:

1. A compound selected from the group consisting of oxazoles and thiazoles of the general formula:

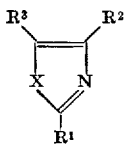

and acid addition salts thereof with pharmaceutically acceptable acids, in which X is selected from the group consisting of oxygen and sulfur atoms, $R^1$ is selected from the group consisting of cycloalkyl radicals containing from 5 to 7 ring carbon atoms, $R^2$ is selected from the group consisting of carboxymethyl, carboxyethyl, and carboxyvinyl radicals and the alkali metal salts, lower alkyl and lower dialkylamino lower alkyl esters, and amides thereof, and $R^3$ is selected from the group consisting of hydrogen atoms, thienyl and phenyl radicals, and phenyl radicals substituted by halogen, lower alkyl, lower alkoxy, and polyhalo lower alkyl.

2. A compound according to claim 1, which is 2-cyclohexylthiazol-4-ylacetic acid.

3. A compound according to claim 1, which is 2-cyclohexylthiazol-4-ylacetamide.

4. A compound according to claim 1, which is α-(2-cyclohexylthiazol-4-yl)propionic acid.

5. A compound according to claim 1, which is β-(2-cyclohexylthiazol-4-yl)propionic acid.

6. A compound according to claim 1, which is 2-cyclohexylthiazol-4-ylacetic acid β-dimethylaminoethyl ester.

7. A compound according to claim 1, which is 2-cyclohexylthiazol-4-ylacetic acid n-butyl ester.

8. A compound according to claim 1, which is 2-cyclohexylthiazol-4-ylacetic acid ethyl ester.

9. A compound according to claim 1, which is 2-cyclohexyl-5-phenylthiazol-4-ylacetic acid.

10. A compound according to claim 1, which is 2-cyclohexyloxazol-4-ylacetic acid.

11. A compound according to claim 1, which is β-(2-cyclohexylthiazol-4-yl)acrylic acid.

References Cited

UNITED STATES PATENTS

| 2,423,709 | 7/1947 | Knott | 260—302 |
| 3,112,291 | 11/1963 | Anderson | 260—307 |

ALEX MAZEL, Primary Examiner

R. J. GALLAGHER, Assistant Examiner

U.S. Cl. X.R

260—332.2, 468, 473, 476, 483, 551, 593; 424—270, 272